Figure 1:
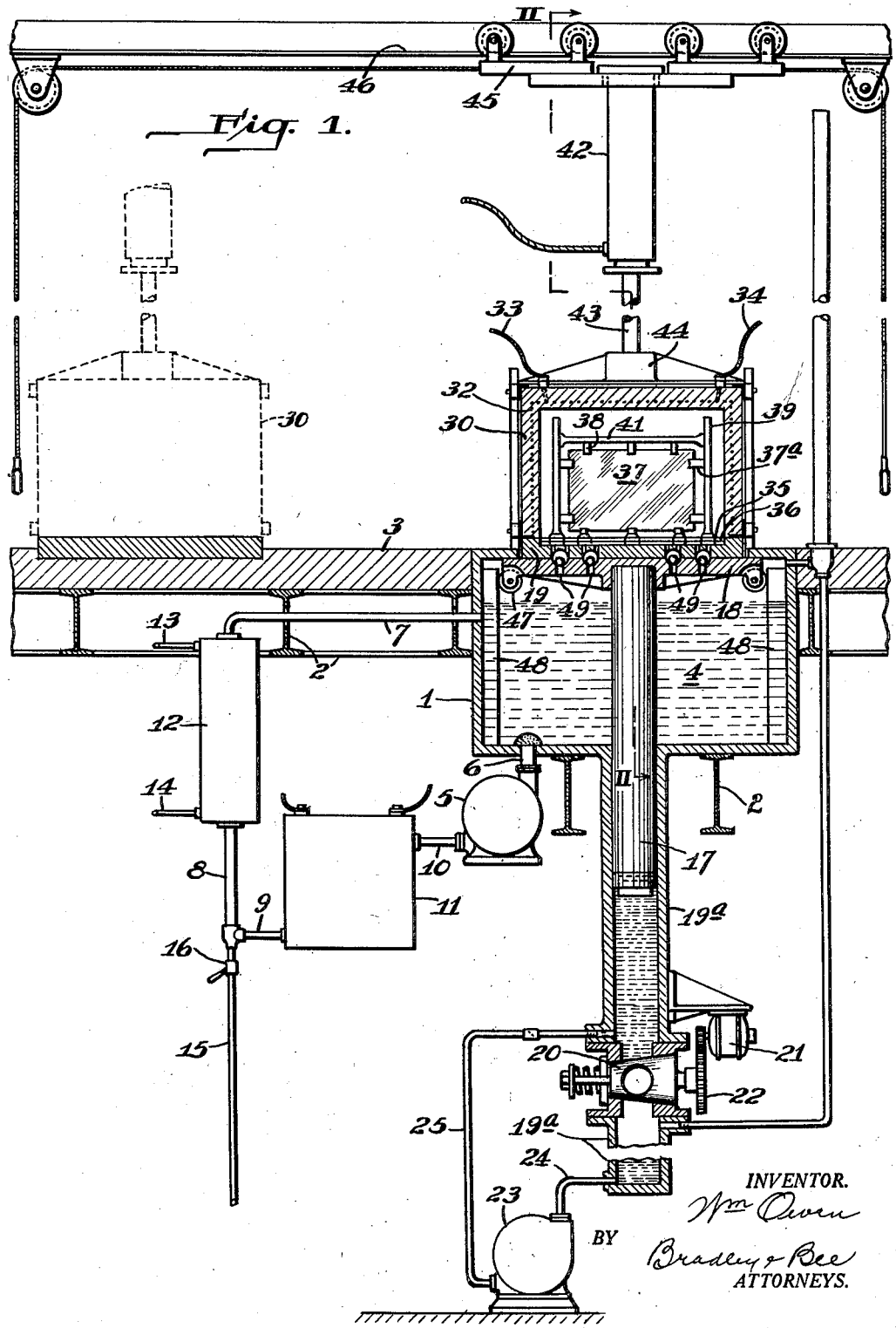

May 15, 1934.  W. OWEN  1,959,215

PROCESS AND APPARATUS FOR MAKING CASE HARDENED GLASS

Filed Feb. 9, 1932  3 Sheets-Sheet 1

INVENTOR.
Wm Owen
BY Bradley & Bee
ATTORNEYS.

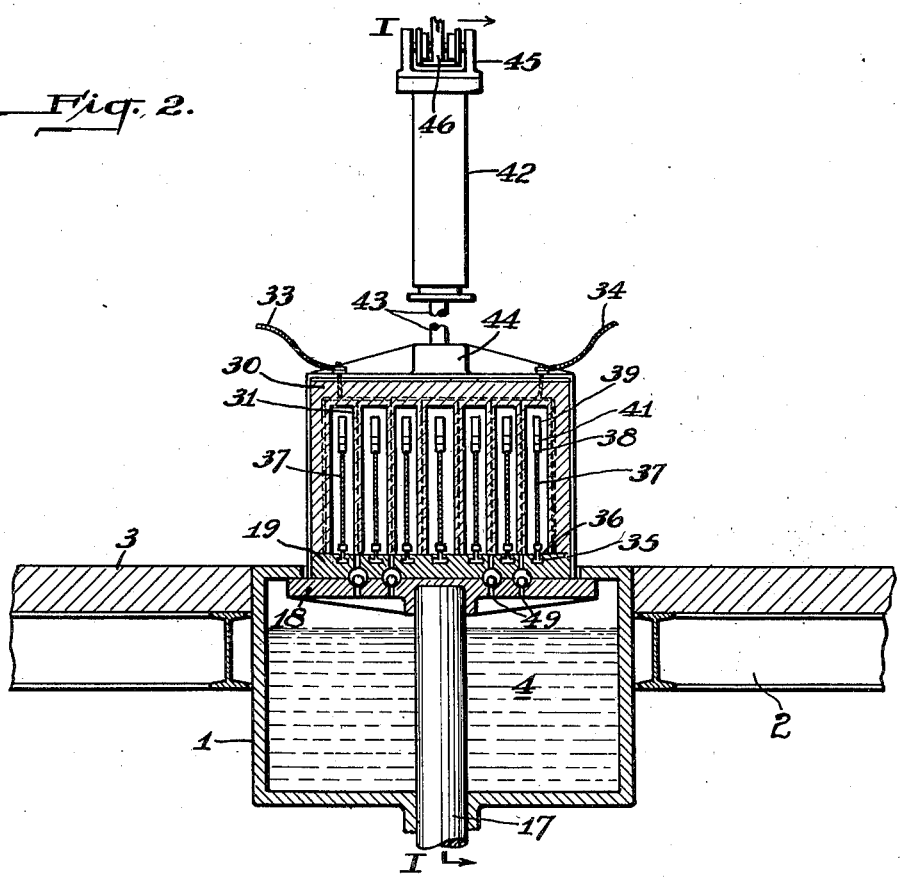
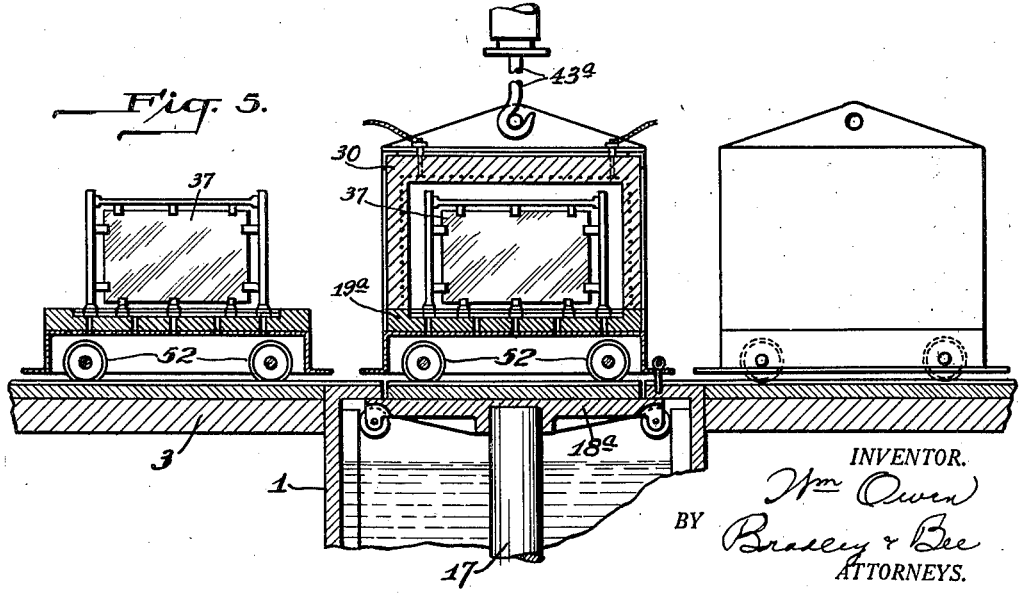

Fig. 3.
Fig. 4.
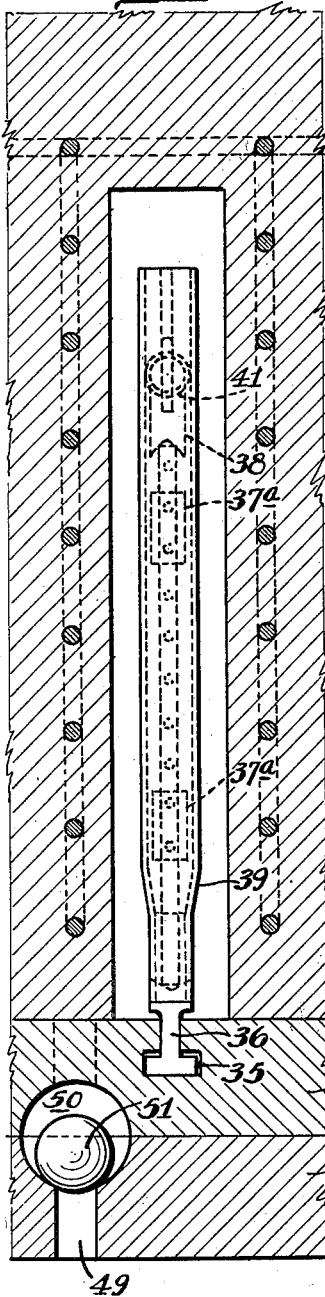
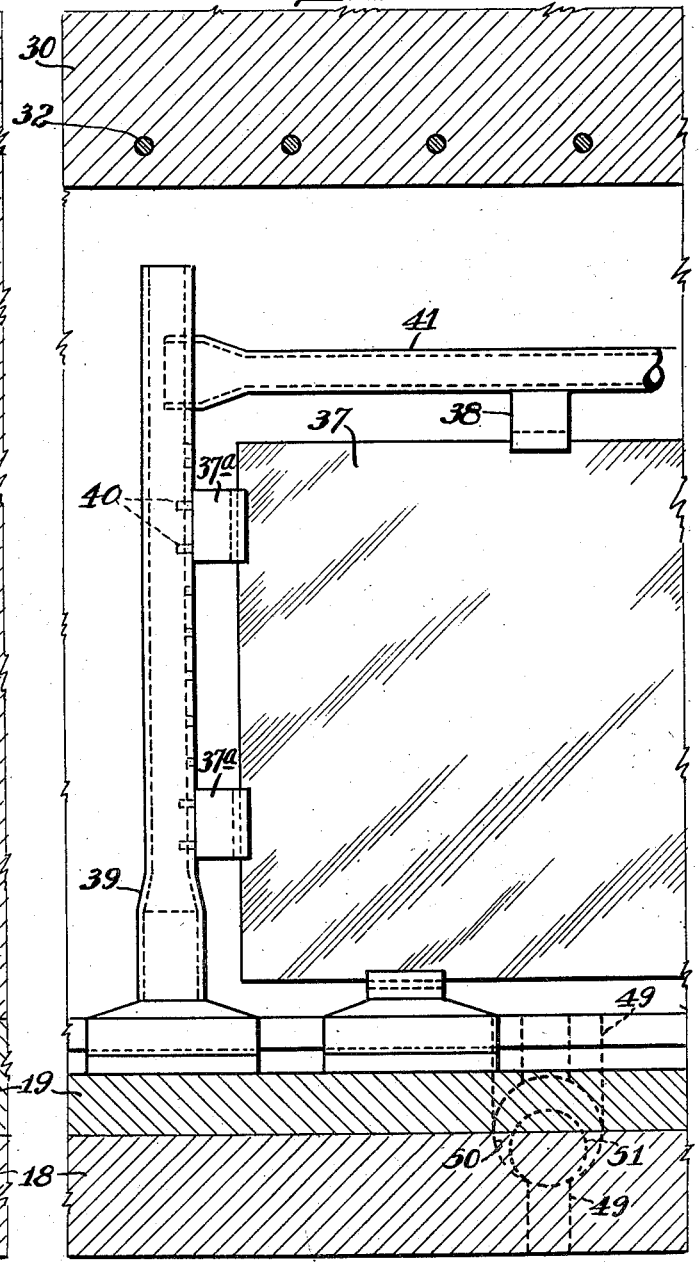

Patented May 15, 1934

1,959,215

UNITED STATES PATENT OFFICE 1,959,215

PROCESS AND APPARATUS FOR MAKING CASE HARDENED GLASS

William Owen, Pittsburgh, Pa., assignor to Pittsburgh Plate Glass Company, a corporation of Pennsylvania Application February 9, 1932, Serial No. 591,803

8 Claims. (Cl. 49—45)

The invention relates to a process and apparatus for making case hardened glass by the liquid immersion system, which consists in heating the glass to a point approximately the softening point and then plunging it into a bath of cooling liquid. The invention has for its objects the provision of an improved process and apparatus for accomplishing the functions of heating the glass sheets and then quenching or cooling them, (1) which insures the protection of the glass from the cooling action of the atmosphere between the heating and surface chilling steps, (2) which operates with certainty, and uniformity, and (3) which is economical in operation and handles a number of sheets at a single operation. Certain embodiments to the invention are shown in the accompanying drawings, wherein:

Fig. 1 is a vertical section through the apparatus on the line I—I of Fig. 2. Fig. 2 is a partial section through the apparatus on the line II—II of Fig. 1. Figs. 3 and 4 are enlarged detail sections showing the method of supporting the glass plates. Fig. 5 is a vertical section similar to that of Fig. 1, showing a modification.

Referring to the general arrangement as shown in Figs. 1 and 2; 1 is a tank mounted in the structural work 2 with its upper end at approximately the level of the floor 3. This tank carries a body of liquid 4 for cooling or quenching the glass sheets after they have been heated to a high temperature, as later described. This liquid is one which can be carried at a relatively high temperature without flashing or igniting, as in some cases a temperature from 700° to 800° F. is required in order to prevent breakage of the glass when it is plunged quickly into the liquid. A circulating system for regulating the temperature is provided in the form of the pump 5, the pipes 6, 7, 8, 9, and 10, and the heat exchangers 11 and 12 which are diagrammatically shown. The heat exchanger 11 is intended for heating the liquid, and the exchanger 12 is for cooling it. Ordinarily the application of heat is necessary, but in some cases the liquid may become over-heated from its contact with the hot glass, and in that case the cooling device 12 comes into play.

The cooling device 12 may be cooled by means of water circulated through the pipes 13 and 14. A pipe 15 provides for draining the system, a valve 16 being located in this pipe.

For governing the movement of the glass sheets into and out of the liquid, the plunger 17 is provided carrying at its upper end a base made up of the plates 18 and 19, the plate 18 being secured to the upper end of the plunger. The plunger is mounted in a cylinder 19$^a$ provided with a plug valve 20, such plug valve being rotated from the motor 21 through the spur gearing 22. When it is desired to lower the plunger, the valve is moved to open position at right angles to the position shown, thus permitting the liquid to flow freely to the bottom of the cylinder. When it is desired to raise the plunger, the plug 20 is turned to closed position and the pump 23 is operated to pump the liquid from the lower end of the cylinder 19$^a$ to the portion of the cylinder lying above the plug valve. This circulation is accomplished through the pipes 24 and 25. Seated upon the plate 19 and having its lower side open is the heating chamber 30, preferably of refractory material, and provided with a series of vertical partitions 31—31 etc. The walls of the chamber and the partitions are heated electrically by means of the resistance wires 32 connected to the leads 33, 34. The plate 19 is provided with a plurality of T slots 35 as shown in Figs. 2 and 3, and in these slots are slidably mounted the blocks 36 grooved as shown in Fig. 3 and adapted to support the glass sheets 37. Each of the glass sheets is held in vertical position by means of the blocks 37$^a$ at the sides of the sheet and the blocks 38 at the top of the sheet. Blocks 37$^a$ are carried upon standards 39 which fit into the T slots in the plate 19. These standards are freely movable in the T slots so that they can be readily adjusted to position and are free to give under the expansion of the glass. The blocks 37$^a$ can be adjusted vertically on the standards and are held in adjustable position by means of pins 40. The blocks 38 are supported on a transverse bar 41, whose ends are slidable vertically on the standards 39. The blocks 37$^a$ are therefore free to follow the upper edge of the glass as the sheet expands and contracts. The chamber itself is mounted for vertical movement by means of the cylinder 42 provided with a lifting plunger 43 connected with the frame-work 44 of the chamber. The cylinder is in turn carried by a trolley 45 mounted for lateral movement on the track 46. This provides for the removal of the chamber in order to provide for the positioning of the glass plates in position upon the plate 19 preliminary to the heating operation.

In order to provide for the rapid movement of the glass sheets into the cooling bath the plate 18, which acts as a closure for the tank when in position as shown in Fig. 1, is made of substantially less diameter than the interior of the tank. The liquid in the tank, therefore, flows up freely around the edges of the plates 18 and 19 when the plug valve 20 is turned to release position, so that a rapid downward movement of the plates 18 and 19 and the glass sheets is secured, this rapid immersion being necessary in order to avoid breakage. In order to guide the plates 18 and 19 as they move down, rollers 47 are provided upon the edges of the plate 18, such rollers engaging suitable guide members 48 secured to the side edges of the tank. In order to still further promote the free flow of liquid from the lower to the upper side of the plates 18 and 19, the passage ways 49 are provided, having enlargements 50 carrying the check or float valves 51. This permits of a free flow upward and at the same time secures a closure when the parts are in the position shown in Fig. 1, thus preventing the escape of fumes from the high heated liquid 4.

Fig. 5 illustrates a modification in which the plate 19—A is carried upon the wheels 52 which in turn rest upon the plate 18—A, corresponding to the plate 18 of Fig. 1. The plate 18—A is in substantial alinement with the floor 3, so that such floor acts as a runway for the chamber 30 and the parts carried thereby. This arrangement permits of the use of a series of chambers which are run into position one after another. The plates thus being heated preliminary to placing upon the plate 18—A. This arrangement permits the rapid operation of the system using only a single cooling tank. The construction of Fig. 5 is similar in other respects to that of Figs. 1 to 4, similar reference numerals being used throughout. The construction permits of a rapid and economical operation with a minimum amount of labor. It also permits the glass sheets to be handled in multiple and immersed rapidly and without exposure to outer air, thus reducing breakage to the minimum. The chamber 30 is carried releasably upon the plunger rod 43—A, and in operation, after the glass is lowered into the cooling bath the chamber 30 is removed by the hoist and positioned over the next carriage of the series and the heating of the glass plates is begun. By the time the glass in the bath is chilled and removed, the glass on the next car is heated; and after this is run on to the plate 19—A the cycle may be repeated.

The cooling liquid preferably used in the tank 1, is a mineral oil with volatile constituents removed to raise the flash point to a very high point, as heretofore pointed out, the temperature for quenching three-sixteenth glass being between 700 and 800 degrees F. After the chilling operation the glass may be removed immediately without danger of breakage by supplying fluid pressure beneath the plunger 17.

What I claim is:

1. A process of case hardening a sheet of glass which consists in heating it to a high temperature, supported in a vertical position in a closed chamber over a cooling bath of liquid, and then withdrawing the sheet downwardly from the chamber into the bath.

2. Apparatus for making case hardened glass, comprising a cooling bath of liquid, a base mounted for vertical movement into and out of the liquid, means for supporting a glass sheet in vertical position upon the base, a chamber having its bottom open seated on the base and surrounding the glass sheet, means for heating the chamber, means for supporting the chamber from above and moving it vertically, and means for moving the base vertically.

3. Apparatus for making case hardened glass, comprising a cooling bath of liquid, a base mounted for vertical movement into and out of the liquid, means for regulating the temperature of the liquid, means for supporting a glass sheet in vertical position upon the base, a chamber having its bottom open seated on the base and surrounding the glass sheet, means for heating the chamber, means for supporting the chamber from above and moving it vertically, and means for moving the base vertically.

4. Apparatus for making case hardened glass, comprising a tank carrying a bath of cooling liquid, a base mounted for vertical movement into and out of the liquid and constituting when in its upper position a closure for the tank, means for supporting a glass sheet in vertical position on the base, a chamber having its bottom open seated on the base and surrounding the glass sheet, means for heating the chamber, means for supporting the chamber from above and moving it vertically, and means for moving the base vertically.

5. Apparatus for making case hardened glass, comprising a tank carrying a bath of cooling liquid, a base mounted for vertical movement into and out of the liquid and constituting when in its upper position a closure for the tank, means for supporting a glass sheet in vertical position on the base, a chamber having its bottom open seated on the base and surrounding the glass sheet, means for heating the chamber, means for supporting the chamber from above and moving it vertically, and means for moving the base vertically, said base being formed to permit the free passage of liquid to its upper side as it moves down through the liquid.

6. Apparatus for making case hardened glass, comprising a tank carrying a bath of cooling liquid, a base mounted for vertical movement into and out of the liquid and constituting when in its upper position a closure for the tank, means for supporting a glass sheet in vertical position on the base, a chamber having its bottom open seated on the base and surrounding the glass sheet, means for heating the chamber, means for supporting the chamber from above and moving it vertically, and means for moving the base vertically, said base fitting into the tank with a substantial clearance between its edges and the side of the tank to permit the free passage of liquid to its upper side as it moves down through the liquid.

7. Apparatus for making case hardened glass, comprising a tank carrying a bath of cooling liquid, a base mounted for vertical movement into and out of the liquid and constituting when in its upper position a closure for the tank, means for supporting a glass sheet in vertical position on the base, a chamber having its bottom open seated on the base and surrounding the glass sheet, means for heating the chamber, means for supporting the chamber from above and moving it vertically, and means for moving the base vertically, said base being provided with openings therethrough carrying upwardly opening check valves to permit the free passage of liquid as the base moves down through the liquid.

8. Apparatus for making case hardened glass, comprising a tank carrying a bath of cooling liquid, a runway extending to the tank at the upper end thereof, a plate mounted for vertical movement into and out of the liquid and adapted when in its upper position to form a closure for the tank with its upper face at approximately the level of the runway, a carriage mounted on the plate for movement laterally across the plate and the runway, means for supporting a glass sheet in vertical position on the carriage, a chamber having its bottom open seated on the carriage and surrounding the glass sheet, means for heating the chamber from above and moving it vertically and laterally, and means for moving said plate vertically.

WILLIAM OWEN.